June 24, 1947.  G. E. DATH  2,422,717
FRICTION SHOCK ABSORBING MECHANISM
Filed May 29, 1944
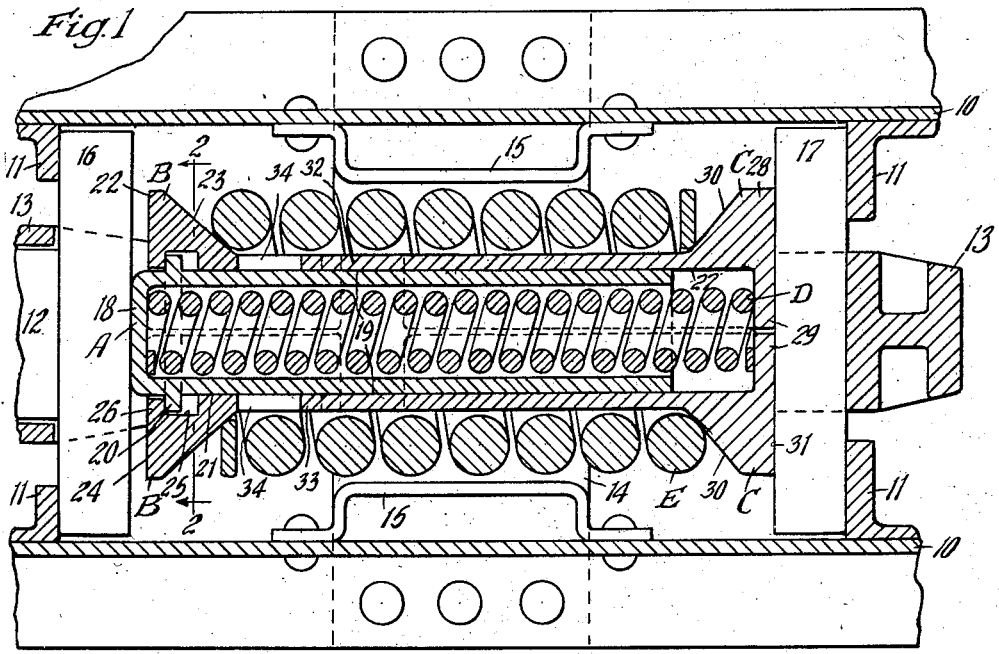
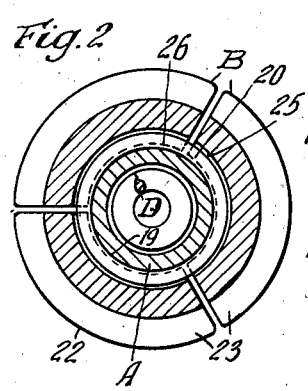
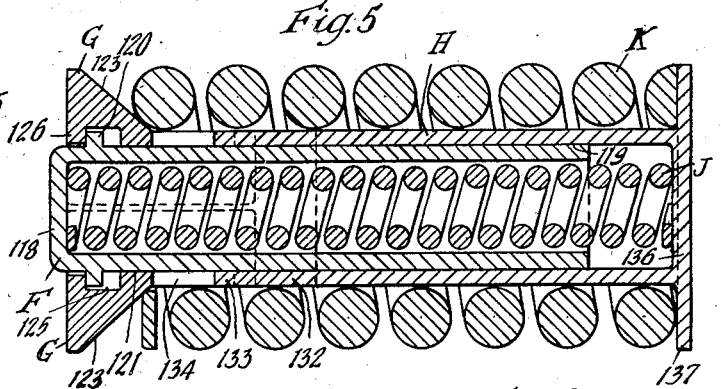
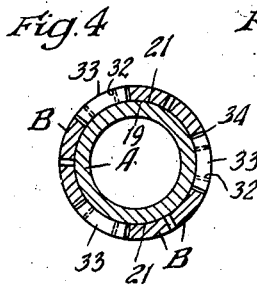
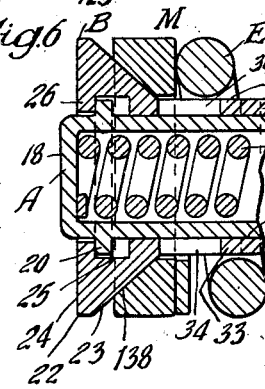
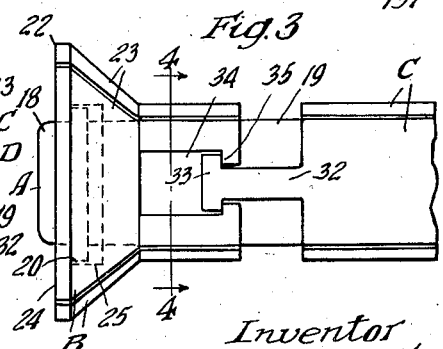
Inventor
George E. Dath
By Henry Fuchs
Atty.

Patented June 24, 1947

2,422,717

UNITED STATES PATENT OFFICE 2,422,717

FRICTION SHOCK ABSORBING MECHANISM

George E. Dath, Mokena, Ill., assignor to W. H. Miner, Inc., Chicago, Ill., a corporation of Delaware Application May 29, 1944, Serial No. 537,788

14 Claims. (Cl. 213—36)

This invention relates to improvements in friction shock absorbing mechanisms, and more particularly to friction shock absorbing mechanisms employed in railway draft riggings.

One object of the invention is to provide a simple and efficient friction shock absorbing mechanism, especially adapted for railway draft riggings, having initial relatively light resistance to absorb the lighter shocks to which the mechanism is subjected, followed by heavier resistance after a predetermined compression of the mechanism to absorb the heavier shocks.

A more specific object of the invention is to provide a mechanism as set forth in the preceding paragraph having relatively high spring capacity.

Other objects of the invention will more clearly appear from the description and claims hereinafter following.

In the drawing forming a part of this specification, Figure 1 is a horizontal, longitudinal sectional view of a portion of a railway draft rigging, illustrating my improvements in connection therewith, the section through the friction shock absorbing mechanism being on two intersecting planes at an angle of 120 degrees to each other. Figure 2 is a transverse, vertical sectional view, corresponding substantially to the line 2—2 of Figure 1. Figure 3 is a side elevational view of the front end portion of the improved friction shock absorbing mechanism illustrated in Figure 1, the springs being omitted. Figure 4 is a transverse, vertical sectional view, corresponding substantially to the line 4—4 of Figure 3. Figure 5 is a view, similar to Figure 1, of the friction shock absorbing mechanism only, illustrating another embodiment of the invention. Figure 6 is a view, similar to Figure 5, of the front end portion only of the friction shock absorbing mechanism, illustrating still another embodiment of the invention.

In said drawing, referring first to the embodiment of the invention illustrated in Figures 1 to 4 inclusive, 10—10 indicate channel-shaped center sills of a railway car underframe having the usual front and rear stop lugs 11—11. The inner end portion of the drawbar is indicated by 12 and is connected to a yoke 13, of well-known design. The yoke 13 and the parts therewithin are supported by a detachable saddle plate 14, which is secured to the underneath sides of the draft sills. To center the friction shock absorbing mechanism, the center sills are provided with guide brackets 15—15 on the inner sides thereof. My improved friction shock absorbing mechanism and the usual front and rear followers 16 and 17 are contained within the yoke 13.

My improved friction shock absorbing mechanism, as illustrated in Figures 1 to 4 inclusive, comprises broadly a hollow friction post A; three friction shoes B—B—B at the front end of the mechanism; three friction shoes C—C—C at the rear end of the mechanism; an inner relatively light spring D; and an outer heavier spring E.

The friction post A is in the form of a hollow, tubular member closed at the front end by a transverse wall 18. As clearly shown in Figure 1, the post A is open at its rear end. On the outer side, the post A has a longitudinally extending, cylindrical friction surface 19 with which the shoes B—B—B and C—C—C are engaged. At the forward end, the post A is provided with a laterally outwardly projecting, annular stop flange 20, which is spaced a short distance inwardly from the front end thereof.

The friction shoes B, which are three in number, surround the front end portion of the friction post A and are symmetrically arranged thereabout. Each shoe B has a transversely curved friction surface 21 on the inner side thereof cooperating with the friction surface 19 of the post. At the forward end, each shoe B is laterally outwardly enlarged, as indicated at 22. The enlargement 22 has a rearwardly extending, outwardly and forwardly inclined wedge face 23 on the outer side thereof. The wedge face 23 is of conical contour and is preferably disposed at an angle of 40 degrees with respect to the central, longitudinal axis of the mechanism. At the forward end, each shoe B has a flat, transverse face 24 adapted to be engaged by the front follower 16 during compression of the mechanism. On the inner side, each shoe B is provided with a transverse, groove or slot 25, the front wall 26 of which serves as a stop shoulder cooperating with the flange 20 of the post A to restrict outward movement of the post with respect to the shoes B—B—B.

The friction shoes C are three in number and surround the rear end portion of the post A and are symmetrically arranged thereabout. Each shoe C has a transversely curved, inner friction surface 27, which engages with the friction surface 19 at the rear end portion of the post. Each shoe C is laterally outwardly enlarged at the rear end thereof, as indicated at 28, and said enlarged portion of the shoe C is provided with a laterally inwardly projecting flange 29, which serves as an abutment for the rear end of the inner spring D. On the outer side thereof, the enlargement 28 of the shoe is provided with a wedge face 30, which is outwardly and rearwardly inclined. The wedge face 30 is of conical contour and is preferably disposed at an angle of 50 degrees with respect to the central, longitudinal axis of the mechanism. At the rear end, each shoe C presents a flat, transverse face 31, which bears on the rear follower 17 of the draft rigging. Each shoe C has a forwardly projecting, lengthwise extending arm 32, provided with a head 33 of the T-shape formation at its end, which is engaged in an opening 34 of the corresponding front shoe B. The opening 34 is shaped to receive the arm and the T-head and has rear shoulders 35—35, which are engaged by the head to limit lengthwise separation of the shoes B and C.

The inner spring D is in the form of a relatively light coil and is telescoped within the friction post, having its front and rear ends bearing respectively on the front end wall 18 of the post A and the lateral flanges 29—29—29 of the rear shoes C—C—C. The spring D is preferably under initial compression in the assembled condition of the mechanism.

The outer spring E is in the form of a relatively heavy coil and surrounds the shoes B—B—B and C—C—C. The front end coil of the spring E bears on the wedge faces 23—23—23 of the shoes B—B—B, and the rear end coil thereof bears on the wedge faces 30—30—30 of the shoes C—C—C. The spring E is also under a predetermined initial compression and, through its engagement with the wedge faces of the front and rear shoes, wedges the shoes inwardly against the friction surface of the post A.

In assembling the mechanism illustrated in Figures 1 to 4 inclusive, the spring D is first placed within the hollow post A and the shoes C—C—C are then telescoped over the rear end of the post. Next the spring E is placed around the shoes C and rearwardly compressed to permit assembling of the shoes B—B—B with the post A. In applying the shoes B—B—B, the post is also forced rearwardly against the resistance of the inner spring D. With the spring E compressed and the post A forced inwardly, the three shoes B—B—B are placed around the front end of the post, the flange 20 of the post being engaged within the grooves 25—25—25 of the shoes and the T-heads 33—33—33 of the arms of the shoes C—C—C engaged within the openings 34—34—34 of the shoes B—B—B. The mechanism is then permitted to expand, assuming the normal position shown in Figure 1, with outward movement of the shoes B—B—B limited by engagement of the T-heads of the shoes C—C—C therewith and outward movement of the post A, in turn, limited by shouldered engagement of the flange 20 thereof with the front end walls of the slots 25—25—25 of the shoes B—B—B.

The operation of my improved shock absorbing mechanism is as follows: Upon relative movement of the followers 16 and 17 of the draft rigging toward each other, the mechanism is compressed therebetween, thereby forcing the friction post to move inwardly against the resistance of the inner spring D. At the same time, due to the shoes B—B—B being wedged against the friction post by the outer spring E, these shoes move inwardly with the post compressing the outer spring E. As the post A moves inwardly, light frictional resistance is created between the friction shoes C—C—C and the friction surface 19 of the post, due to these shoes being wedged inwardly by the spring E. This action continues until the rear ends of the shoes B—B—B come into engagement with the front ends of the shoes C—C—C, whereupon inward movement of the shoes B—B—B is positively arrested. The post A is then compelled to move inwardly with respect to the shoes B—B—B during the remainder of the compression stroke of the mechanism, with resultant high frictional resistance between the post and the shoes B—B—B. The frictional resistance between the shoes B—B—B and the post is in addition to that provided between the rear end of the post and the shoes C—C—C. Compression of the mechanism is finally limited by engagement of the front follower 16 with the front ends of the shoes B—B—B.

Referring next to the embodiment of the invention illustrated in Figure 5, the construction is similar to that shown in Figures 1 to 4 inclusive, with the exception that a tubular casing is employed at the rear end of the post, instead of the friction shoes C—C—C.

My improved mechanism, as shown in Figure 5, comprises broadly a friction post F; three friction shoes G—G—G; a tubular casing H; a relatively light inner spring J; and an outer heavy spring K.

The post F is identical with the post A hereinbefore described and has a transverse, front, end wall 118, an outer friction surface 119, and a stop flange 120, identical with the transverse, front wall 18, the friction surface 19, and the stop flange 20 of the post A.

The friction shoes G are identical with the shoes B hereinbefore described in connection with Figures 1 to 4 inclusive, each shoe G having an inner friction surface 121, a wedge face 123, a groove or slot 125 on the inner side thereof, providing a stop shoulder 126; all identical with the friction surface 21, the wedge face 23, the slot 25, and the stop shoulder 26 of the shoe B hereinbefore described.

The casing H is in the form of an elongated cylinder, closed by a transverse, rear end wall 136. The wall 136 is extended laterally outwardly of the casing to provide an annular spring follower flange 137 at the rear end of said casing.

The casing H has three forwardly extending arms 132, each arm having a T-head 133 engaging an opening 134 of the corresponding shoe G, the arm 132, T-head 133, and opening 134 being similar to the arm 32, the T-head 33, and the opening 34 of the shoes C and B hereinbefore described and operating in a similar manner to limit relative lengthwise separation of the casing H and the shoes G—G—G.

The inner spring J is similar to the spring D hereinbefore described and bears at its front and rear ends on the transverse front wall 118 of the post F and the transverse rear wall 136 of the casing H.

The outer spring K is similar to the spring E hereinbefore described and is interposed between the wedge faces 123—123—123 of the shoes G—G—G and the annular flange 137 at the rear end of the casing H.

In assembling the mechanism shown in Figure 5, a procedure similar to that described in connection with the assembling of the mechanism shown in Figures 1 to 4 inclusive is followed.

In the operation of the improved shock absorbing mechanism shown in Figure 5, the initial action is similar to that hereinbefore described in connection with Figures 1 to 4 inclusive, with the exception that there is no frictional resistance, the inner spring J being compressed by relative movement of the post F and the casing H, and and the outer spring K being compressed against the rear flange of the casing H by inward movement of the shoes G—G—G with the post F. When movement of the shoes G—G—G is limited by engagement with the front end of the casing H, the post is compelled to move inwardly with respect to the shoes, thereby setting up high frictional resistance during the remainder of the compression stroke of the mechanism.

Referring next to the embodiment of the invention shown in Figure 6, the construction differs from Figures 1 to 4 inclusive and Figure 5 only in that a wedge ring is interposed between the outer coil spring and the wedge faces of the fricton shoes. Figure 6 shows only the front end of the mechanism, and the post, shoes, and inner and outer springs shown are identical with the corresponding parts illustrated in Figures 1 to 4 inclusive, and these members, together with the different elements thereof, are indicated by the same reference characters as employed in Figures 1 to 4 inclusive.

The wedge ring, which is indicated by M, surrounds the shoes B—B—B and has a wedge face 138 at the front side thereof, which is correspondingly inclined to and engages the wedge faces of the shoes B—B—B. The outer spring E bears on the rear face of the ring, thereby forcing the same against the wedge faces of the friction shoes.

In applying this modification of the invention to the design shown in Figures 1 to 4 inclusive, wedge rings are employed at both ends of the mechanism. The wedge ring employed at the rear end of the mechanism is identical with the ring M shown in Figure 6 and is interposed between the rear end of the spring E and the wedge faces 30—30—30 of the shoes C—C—C.

In applying the embodiment of the invention shown in Figure 6 to a friction shock absorbing mechanism of the design shown in Figure 5, it is evident that the wedge ring M is employed only at the front end of the mechanism in connection with the shoes G—G—G, the rear end of the outer spring bearing directly on the annular flange at the rear end of the tubular casing H.

The operation of the invention shown in Figure 6 is identical with that hereinbefore described in connection with Figures 1 to 4 inclusive and Figure 5, with the exception that the shoes are wedged inwardly by a wedge ring instead of the outer spring being in direct wedging engagement with the wedge faces of the shoes.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with an inwardly movable column element having longitudinally extending friction surfaces; of friction shoes having sliding frictional engagement with said column element; means yieldingly opposing inward movement of said column element; yielding means wedging said shoes against said column element to grip said column element and be moved in unison therewith, said yielding means including a spring yieldingly opposing inward movement of said shoes; and stop means arresting inward movement of said shoes after a predetermined compression of the mechanism, thereby compelling said column to be moved inwardly with respect to the shoes during the remainder of the compression stroke of the mechanism to provide high frictional resistance.

2. In a friction shock absorbing mechanism, the combination with an inwardly movable column element adapted to receive the actuating force, said column element having longitudinally extending friction surfaces; of friction shoes engaging the friction surfaces of said column element, said shoes and column element having limited relative lengthwise movement with respect to each other; spring means yieldingly opposing inward movement of said column element; means for forcing said shoes against the column element into tight frictional engagement with the friction surfaces thereof, to grip said column element and effect movement of the shoes inwardly of the mechanism in unison with said column element during the initial portion of the compression stroke; and means for arresting inward movement of the shoes after a predetermined compression of the mechanism, thereby compelling relative movement of the column and shoes during the remainder of the compression stroke with resultant high frictional resistance.

3. In a friction shock absorbing mechanism, the combination with a hollow friction post adapted to receive the actuating force, said post having longitudinally extending friction surfaces; of spring means yieldingly opposing inward movement of the post; friction shoes having sliding engagement with the post; means for forcing said shoes against the post into tight frictional gripping engagement therewith for movement of said shoes inwardly of the mechanism in unison with the post, said last named means including a spring yieldingly opposing inward movement of the shoes; means for restricting outward movement of the shoes; cooperating means on said post and shoes for limiting outward movement of the post with respect to the shoes, with the post normally projecting outwardly beyond the shoes; and stop means for arresting inward movement of the shoes after a predetermined partial compression of the mechanism to compel relative movement of the post with respect to said shoes during the remainder of the compression stroke of the mechanism.

4. In a friction shock absorbing mechanism, the combination with a hollow friction post adapted to receive the actuating force, said post having lengthwise extending, exterior friction surfaces; of spring means yieldingly opposing inward movement of the post; friction shoes having sliding engagement with the post; a combined wedge and spring follower having wedging engagement with the shoes; a spring yieldingly opposing inward movement of the combined wedge and spring follower and wedge said shoes into frictional gripping engagement with the post; means for restricting outward movement of the shoes; cooperating means on the post and shoes for limiting outward movement of the post with respect to the shoes, with the post normally projecting outwardly beyond the shoes; and stop means for arresting inward movement of the shoes after a predetermined partial compression of the mechanism to compel sliding movement of the post and shoes with respect to each other during the remainder of the compression stroke.

5. In a friction shock absorbing mechanism, the combination with a hollow friction post adapted to receive the actuating force, said post having lengthwise extending, exterior friction surfaces; of spring means telescoped within the post and yieldingly opposing inward movement of the post; friction shoes having lengthwise sliding engagement with the post; yielding means for forcing said shoes into frictional gripping engagement with the post for movement in unison with said post during predetermined partial compression of the mechanism; means for limiting outward movement of the shoes; cooperating stop shoulders on said shoes and post limiting outward movement of the post with respect to the shoes, with the post normally projecting slightly beyond the outer ends of the shoes; and stop means for arresting inward movement of the shoes after a said predetermined partial compression of the mechanism to compel relative sliding movement of said shoes and post during the remainder of the compression stroke of the mechanism.

6. In a friction shock absorbing mechanism, the combination with an inwardly movable column element having longitudinally extending friction surfaces; of friction shoes at the front and rear ends of said column element in sliding engagement therewith, said front and rear shoes having shouldered engagement with each other to limit lengthwise separation of said front and rear shoes; spring means yieldingly opposing relative lengthwise movement of the column and said rear shoes; cooperating limiting stops on said column and front shoes to limit outward movement of said column with respect to said front shoes, with the outer end of said column normally projecting beyond the ends of said front shoes; and yielding means for forcing said shoes against said column, said yielding means including a spring which yieldingly opposes relative lengthwise movement of the front and rear shoes toward each other.

7. In a friction shock absorbing mechanism, the combination with an inwardly movable column element having longitudinally extending friction surfaces; of friction shoes at the front and rear ends of said column element in sliding engagement therewith, said front and rear shoes having shouldered engagement with each other to limit lengthwise separation of said front and rear shoes; spring means yieldingly opposing relative lengthwise movement of the column and said rear shoes; cooperating limiting stops on said column and front shoes to limit outward movement of said column with respect to said front shoes, with the outer end of said column normally projecting beyond the ends of said front shoes; and a spring interposed between said front and rear shoes in wedging engagement therewith and yieldingly opposing relative lengthwise movement thereof.

8. In a friction shock absorbing mechanism, the combination with an inwardly movable column element having longitudinally extending friction surfaces; of friction shoes at the front and rear ends of said column element in sliding engagement therewith, said front and rear shoes having shouldered engagement with each other to limit lengthwise separation of said front and rear shoes; spring means yieldingly opposing relative lengthwise movement of the column and said rear shoes; cooperating limiting stops on said column and front shoes to limit outward movement of said column with respect to said front shoes, with the outer end of said column normally projecting beyond the ends of said front shoes; wedge rings at opposite ends of the mechanism having wedging engagement respectively with said front and rear shoes; and a spring interposed between said front and rear wedge rings and yieldingly opposing relative approach thereof.

9. In a friction shock absorbing mechanism, the combination with an inwardly movable, hollow column element having longitudinally extending, exterior friction surfaces; of a plurality of friction shoes surrounding the front end of said column element and having lengthwise sliding engagement therewith; friction shoes surrounding the rear end of said column element in sliding engagement therewith, said rear shoes corresponding in number to said front shoes, and each having a forwardly extending arm anchored to the corresponding front shoe to limit relative lengthwise separation of said front and rear shoes; a spring telescoped within said column and yieldingly opposing relative movement of the same and said rear shoes, said front and rear shoes having inner wedge faces; and a coil spring surrounding said shoes and having wedging engagement at opposite ends with said wedge faces.

10. In a friction shock absorbing mechanism, the combination with a casing; of a hollow column element slidably telescoped within said casing, said column element having longitudinally extending friction surfaces; friction shoes having sliding frictional engagement with said column element, said shoes having their inward movement limited by engagement with the outer end of the casing; a spring within said column element yieldingly opposing relative lengthwise movement of the column element and the casing inwardly toward each other; and yielding means wedging the shoes against the column element, said means including a spring yieldingly opposing inward movement of the shoes with respect to the casing.

11. In a friction shock absorbing mechanism, the combination with a casing; of a hollow column element slidingly telescoped within said casing, said column element having longitudinally extending friction surfaces; friction shoes slidingly engaging the friction surfaces of said column element, said shoes and column element having limited relative lengthwise movement with respect to each other; spring means within said column element yieldingly opposing relative lengthwise movement of the column element and casing; and means for forcing said shoes against the column into tight frictional engagement therewith.

12. In a friction shock absorbing mechanism, the combination with a casing; of a hollow friction post adapted to receive the actuating force, said post being telescoped within the casing for lengthwise movement with respect to the same; spring means within the post opposing inward movement of the post with respect to the casing; friction shoes having sliding engagement with the post; cooperating means on the casing and shoes for limiting inward and outward movement of the shoes; and means for forcing the shoes against the post including a spring yieldingly opposing movement of the shoes and casing toward each other lengthwise of the mechanism.

13. In a friction shock absorbing mechanism, the combination with a casing; of a hollow friction post adapted to receive the actuating force, said post being slidingly telescoped within the casing and having longitudinally extending friction surfaces; spring means within the post yieldingly opposing relative lengthwise movement of the casing and post; friction shoes having sliding engagement with the friction surfaces of the post; a combined wedge and spring follower having wedging engagement with the shoes; a spring yieldingly opposing inward movement of said combined wedge and spring follower with respect to the casing; cooperating means on the post and shoes for limiting outward movement of the post with respect to the shoes, with the post normally projecting outwardly beyond the ends of the shoes; and means on said casing for limiting outward movement of the shoes, said shoes engaging the end of the casing to limit inward movement of the shoes.

14. In a friction shock absorbing mechanism, the combination with a casing; of a hollow friction post adapted to receive the actuating force, said post being slidingly telescoped within the casing and having an exterior, longitudinally extending friction surface; spring means telescoped within the post and yieldingly opposing movement of the post inwardly of the casing; friction shoes having lengthwise sliding engagement with the post; means on said casing for limiting outward movement of the shoes; and cooperating stop shoulders on said post and shoes for limiting outward movement of the post with respect to the shoes, with the post normally projecting slightly beyond the outer ends of the shoes, said shoes having their inward movement limited by engagement with the outer end of the casing.

GEORGE E. DATH.

REFERENCES CITED

The following references are of record in the file of this patent:

UNITED STATES PATENTS

| Number | Name | Date |
|---|---|---|
| 1,096,120 | O'Connor | May 12, 1914 |
| 1,300,700 | Courson | Apr. 15, 1919 |
| 1,303,372 | Nystrom | May 13, 1919 |
| 2,076,769 | Dentler | Apr. 13, 1937 |
| 1,663,994 | O'Connor | Mar. 27, 1928 |